April 27, 1971 R. B. TURNER ET AL 3,576,929

METHOD FOR COOLING BLOWN POLYMER FILMS

Filed June 21, 1968

INVENTORS,
Robert B. Turner
BY Emilio L. Poli

Griswold & Burdick
ATTORNEYS

3,576,929
METHOD FOR COOLING BLOWN POLYMER FILMS
Robert Burton Turner, Lake Jackson, Tex., and Emilio Lawrence Poli, Midland, Mich., assignors to The Dow Chemical Company, Midland, Mich.
Filed June 21, 1968, Ser. No. 738,884
Int. Cl. B29c *17/00, 23/00, 25/00*
U.S. Cl. 264—37
6 Claims

ABSTRACT OF THE DISCLOSURE

This invention relates to the cooling of blown polymer film by spraying a relatively low boiling point liquid onto the film, thereby causing cooling and solidification of the heat plastified polymer. The vaporized liquid coolant is condensed on the exterior wall of a cooling chamber which surrounds the blown film and the condensate is collected and re-cycled.

BACKGROUND OF THE INVENTION

This invention relates to a method for the cooling of blown polymer film and, more particularly, to a method for cooling thin gauge polymer film with a spray of a relatively low boiling point quick vaporizing liquid coolant.

Several methods are presently known for cooling blown polymer film. Some of these utilize a cooling mandrel while others consist of blown air or gas cooling means and still others pass the film through a water bath. It is characteristic that film cooled by the above-described and other similar processes sometimes does not possess the surface smoothness and film clarity obtained by spray cooling. The fast quench obtained by spray cooling most often improves the film clarity, increases the film strength and reduces surface roughness.

SUMMARY OF THE INVENTION

It is an object of the present invention to provide a method for cooling of blown polymer film which in turn frequently enhances the physical properties of the resulting product.

A further object is to provide a method for producing blown polymer film which has the desirable characteristics of clarity, smoothness and increased film strength.

A further benefit derived from the fast quench is a shortened distance between the extrusion die and bubble collapsing means, which reduces the overall length of a new installation of extruding and film wind-up apparatus or increases the output of existing equipment.

These and additional objects and cognate benefits and advantages are achieved in and by practice of the present invention which comprises an improvement in the method for cooling thin gauge polymer film extruded by the bubble process.

After extruding the heat plastified polymeric material in the form of a tube, the tube is inflated and then collapsed at its end distal from the die to form a closed gas space. The improvement comprises a method of cooling the film within a closed housing defining a chamber arranged so as to provide a closed space surrounding the extruded tube. The housing defines end openings which are in sealing engagement with the extruded tube, and the tube thereby functions as an inner wall which further defines the chamber. The film is cooled by spraying it with a low boiling point liquid coolant as it leaves an extrusion die orifice. The coolant's boiling point must be below the temperature (135–215° C.) of the heat plastified polymer. As a spray device applies the liquid coolant, the coolant is carried upward by the moving film and undergoes a substantial amount of vaporization, thereby causing solidification and cooling of the film by heat transfer into the coolant. The vaporized coolant is then condensed and re-cycled through the spray device.

The apparatus comprises a closed housing defining a cooling chamber and end openings. The housing is adapted to be positioned about a polymer film tube, with the end openings adapted to be in sliding sealing engagement with said tube. The extruded tube itself constitutes an inner wall which further defines the cooling chamber.

A liquid coolant spraying means is attached to a wall of the housing adjacent an extrusion die orifice. In order that the coolant might be re-cycled, a liquid receiving area is disposed in a bottom wall of the housing to receive condensed liquid coolant and is in operative combination with a circulating means adapted to forward coolant from the liquid receiving area to the spraying means.

BRIEF DESCRIPTION OF THE DRAWING

In the accompanying drawings wherein preferred embodiments of the invention are illustrated.

DESCRIPTION OF THE PREFERRED EMBODIMENTS

Figure 2:
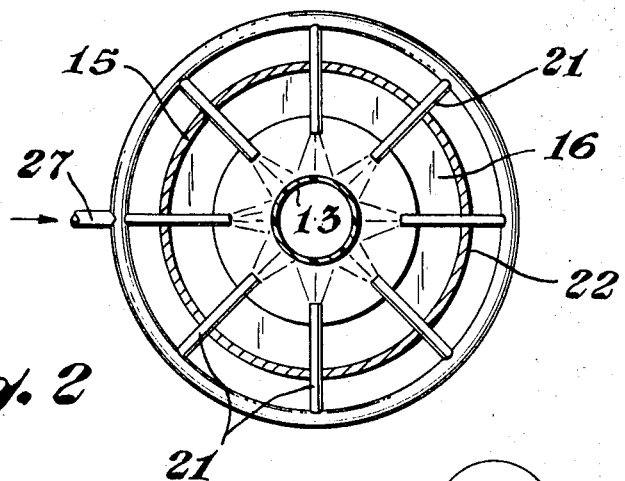
FIG. 2 is a top view of the spray device taken through line 2—2 of FIG. 1.
Figure 1:
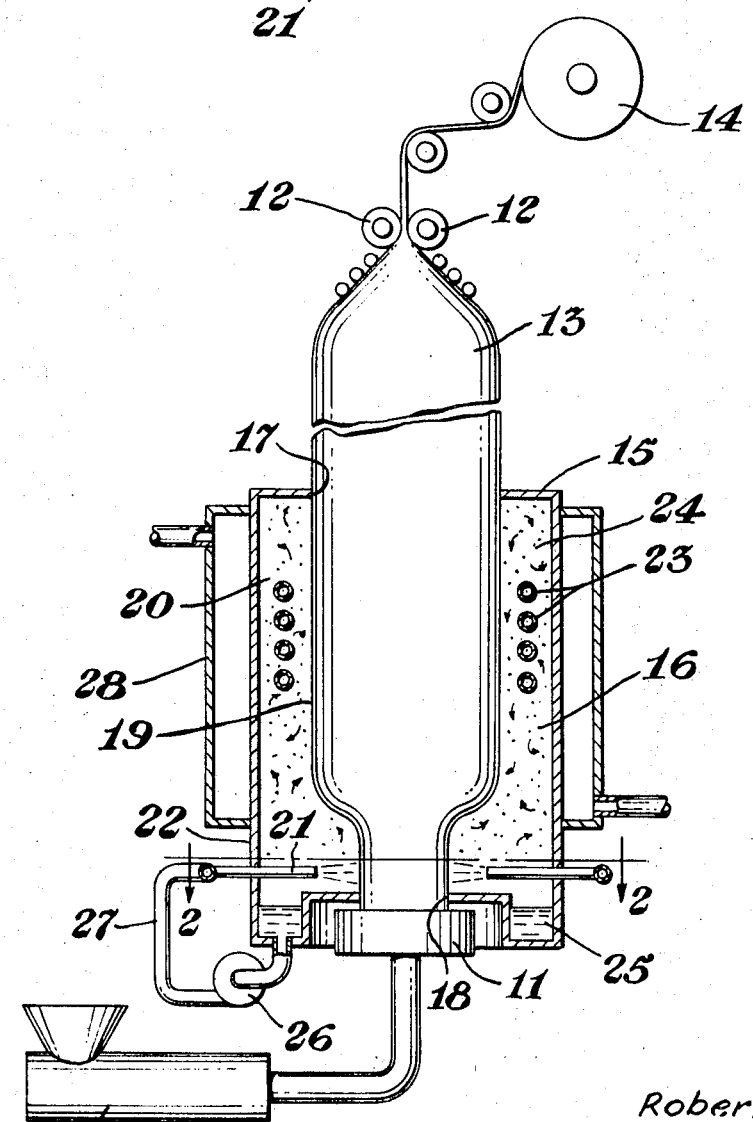
FIG. 1 is schematic cross-sectional representation of the entire extruder, cooling and film windup apparatus of the invention

In accordance with the present invention and referring to the apparatus illustrated in the drawings, the apparatus of FIGS. 1 and 2 consists of an extruder 10 of conventional construction having an upwardly extruding annular die 11. Sets of nip rolls 12 are spaced from the die 11 along the axis of a generally vertically disposed extruded film tube 13. A film windup apparatus 14 is spaced from the nip rolls 12.

Means for cooling the extruded film tube 13 consist of a housing 15 defining an axially elongated toroidally shaped closed cooling chamber 16 with end openings 17, 18, in which the axis of the chamber 16 coincides with the axis of the extruded tube 13. The extruded tube 13 is disposed inside the housing 15 and forms an inner wall 19 which further defines an annular chamber 20. A spray device 21 is attached to an outer wall 22 of the housing 15 immediately above the face of the die 11. Positioning of condenser tubes 23 within the closed cooling chamber 16 provides more effective condensation of the vaporized coolant 24. A liquid receiving area 25 which is lower than any other point of the chamber 16 is disposed in a portion of the wall comprising the underside of the housing 15. A circulating means or liquid forwarding means 26 which beneficially is a centrifugal pump for recycling or circulating the coolant is disposed within a pipeline 27 which has one end attached to the liquid receiving area 25 and the opposite end attached to the spray device 21.

At times when maximum heat transfer is required, it is desirable to pass the condensed coolant through a heat exchanger (not shown) to further lower the temperature of the coolant. In addition heat exchangers 28 can jacket outer walls 22 of the housing 15 in order to lower the temperature of the surfaces on which the coolant vapors 24 are condensed.

The process of the invention may be applied to any thermoplastic polymer film. Liquids which are useful as coolants are those which have a boiling point not greater than the solidification point of the polymer and which do not detrimentally affect the film. Excellent coolants are low boiling point (35°–90° C.) liquids such as methylene chloride, 1,1,1-trichloroethane, and trichloroethylene; refrigerants having boiling points in the 0°–25° C.

range, such as dichloromonofluoromethane, dichlorotetrafluoroethane, and trichloromonofluoromethane; and water.

As a portion of the colant, one is able to apply agents which are useful in imparting desirable properties to the film other than clarity, strength and smoothness. Agents which are found to be useful in treating the blown film when used as a portion of the coolant media are surfactants, lubricants, slip agents, block agents, and the like. An example of a useful surface active agent is Benax 2A1. Chemically the product is dodecyldiphenyl ether disulfonic acid, sodium salt, and is an anionic surface active agent.

As is apparent from the foregoing specification, the present invention is susceptible of being embodied with various modifications which may differ particularly from those which have been described in the preceding specification and description. For this reason it is to be fully understood that all of the foregoing is intended to be merely illustrative and is not to be construed or interpreted as being restrictive or otherwise limiting of the present invention.

What is claimed is:

1. In a method for preparing thin gauge polymer film comprising the steps of
   extruding upwardly a heat plastified polymeric film from a die in the form of a generally vertically disposed tube,
   inflating the tube, and
   collapsing said tube to form a closed gas space, wherein the improvement comprises
   cooling the film within a closed housing defining a chamber arranged so as to provide a close space surrounding the extruded inflated tube, said tube being in sealing engagement with end openings in the housing and constituting an inner wall which further defines the chamber,
   the cooling being accomplished by spraying a liquid coolant having a boiling point below the temperature of the heat plastified polymer onto the film adjacent the die within the chamber,
   vaporizing a substantial amount of liquid coolant by heat supplied by the film, thereby causing solidification and cooling of the film,
   condensing the vaporized coolant remote from the tube to form a condensed liquid coolant and
   re-cycling the condensed liquid.

2. The method of claim 1 in which heat exchange conduit members are disposed within the closed chamber and maintained at a temperature sufficient to condense the vaporized coolant.

3. The method of claim 1 wherein the condensed coolant is passed through a heat exchanger to further cool the the liquid prior to re-cycling.

4. The method of claim 1 wherein said coolant is water.

5. The method of claim 1 wherein said coolant is a liquid halogenated aliphatic compound of one to two carbon atoms.

6. The method of claim 1 including the step of adding surface active agents or lubricating agents as a portion of the coolant media, whereby the surface characteristics of the film are further enhanced.

References Cited

UNITED STATES PATENTS

| 2,927,345 | 3/1960 | Hansen et al. | 264—348X |
| 3,065,501 | 11/1962 | Gasmire | 264—98X |
| 3,311,682 | 3/1967 | Ringley et al. | 264—95 |

FOREIGN PATENTS

| 213,573 | 2/1957 | Australia | 264—209 |

ROBERT F. WHITE, Primary Examiner

J. H. SILBAUGH, Assistant Examiner

U.S. Cl. X.R.

18—14; 264—95, 237